(12) United States Patent
Cho et al.

(10) Patent No.: US 9,162,667 B2
(45) Date of Patent: Oct. 20, 2015

(54) POWER TRANSMITTING APPARATUS FOR VEHICLE

(71) Applicant: Hyundai Motor Company, Seoul (KR)

(72) Inventors: Hyung Wook Cho, Ansan-si (KR); Sueng Ho Lee, Seoul (KR); Jongsool Park, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 81 days.

(21) Appl. No.: 13/908,170

(22) Filed: Jun. 3, 2013

(65) Prior Publication Data
US 2013/0324341 A1  Dec. 5, 2013

(30) Foreign Application Priority Data

Jun. 5, 2012 (KR) .................. 10-2012-0060455
May 9, 2013 (KR) .................. 10-2013-0052732

(51) Int. Cl.
*F16H 3/72* (2006.01)
*B60K 6/365* (2007.10)
(Continued)

(52) U.S. Cl.
CPC ............... *B60W 20/00* (2013.01); *B60K 6/48* (2013.01); *B60K 6/547* (2013.01); *B60K 6/365* (2013.01); *B60K 6/42* (2013.01); *B60K 2006/4825* (2013.01); *B60W 20/30* (2013.01); *B60W 20/40* (2013.01); *F16H 3/006* (2013.01);
(Continued)

(58) Field of Classification Search
CPC ... F16H 2200/0021; F16H 3/72; B60K 6/365; B60K 6/42; B60W 20/20; B60W 20/30; B60W 20/40
See application file for complete search history.

(56) References Cited

U.S. PATENT DOCUMENTS 7,743,677 B2 *  6/2010  Borgerson et al. ............... 74/331
7,748,286 B2 *  7/2010  Baldwin .......................... 74/330
(Continued)

FOREIGN PATENT DOCUMENTS

EP  0 845 618 A2  6/1998
JP  2008-516827 A  5/2008
(Continued)

OTHER PUBLICATIONS

Machine translation of WO 2007/042109 A1 (WIPO), Apr. 2007.*
(Continued)

*Primary Examiner* — Tisha Lewis
(74) *Attorney, Agent, or Firm* — Morgan, Lewis & Bockius LLP

(57) ABSTRACT

A power transmitting apparatus includes: an electric supplementary drive unit; a torque converting device including a planetary gear set having a first rotation element connected to the electric supplementary drive unit, a second rotation element connected to an engine, and a third rotation element operated as an output element; an input device including a first input shaft selectively connected to the second rotation element through one clutch and provided with at least one input gear fixedly disposed thereon, and a second input shaft disposed on the same axis as the first input shaft without rotational interference with the first input shaft, directly connected to the third rotation element, selectively connected to the second rotation element through the other clutch, and provide with at least one input gear fixedly disposed thereon; and a speed output device converting torque of the input device and outputting the converted torque.

28 Claims, 6 Drawing Sheets

(51) Int. Cl.
  *B60K 6/42* (2007.10)
  *B60W 20/00* (2006.01)
  *B60K 6/48* (2007.10)
  *B60K 6/547* (2007.10)
  *F16H 3/00* (2006.01)

(52) U.S. Cl.
  CPC ............... *F16H 3/72* (2013.01); *F16H 3/725* (2013.01); *F16H 2200/0021* (2013.01); *F16H 2200/0056* (2013.01); *Y02T 10/6221* (2013.01); *Y02T 10/6252* (2013.01); *Y10S 903/902* (2013.01)

(56) References Cited

U.S. PATENT DOCUMENTS

| | | | |
|---|---|---|---|
| 7,798,030 B2 | 9/2010 | Lang et al. | |
| 8,075,436 B2 * | 12/2011 | Bachmann | 475/5 |
| 8,307,729 B2 * | 11/2012 | Chazotte | 74/331 |
| 8,734,281 B2 * | 5/2014 | Ai et al. | 475/5 |
| 8,784,245 B2 * | 7/2014 | Ideshio et al. | 475/5 |
| 2009/0120221 A1 * | 5/2009 | Chazotte | 74/330 |
| 2010/0257967 A1 * | 10/2010 | Rieger et al. | 74/331 |
| 2010/0263465 A1 * | 10/2010 | Enstroem et al. | 74/331 |
| 2012/0021861 A1 | 1/2012 | Sakai et al. | |
| 2013/0210567 A1 * | 8/2013 | Puiu | 475/5 |
| 2013/0319142 A1 * | 12/2013 | Kim | 74/57 |
| 2013/0324362 A1 * | 12/2013 | Lee et al. | 477/5 |
| 2013/0337972 A1 * | 12/2013 | Lee et al. | 477/5 |

FOREIGN PATENT DOCUMENTS

| | | |
|---|---|---|
| JP | 2009-511328 A | 3/2009 |
| JP | 2010-70188 A | 4/2010 |
| JP | 2010-195378 A | 9/2010 |
| KR | 10-0852044 B1 | 8/2008 |
| WO | WO 2007042109 A1 * | 4/2007 |
| WO | WO2012084330 A1 * | 6/2012 |

OTHER PUBLICATIONS

Machine translation of WO 2012/084330 A1 (WIPO), Jun. 2012.*

* cited by examiner

FIG.2

| | CL1 | CL2 | 1st | 2nd | 3rd | 4th | 5th | 6th | 7th | Rev. | Note |
|---|---|---|---|---|---|---|---|---|---|---|---|
| REV | | ● | | | | | | | | ● | Regenerative braking possible when MG operates |
| Starting (REV) | | | | | | | | | | ● | Starting control of engine and MG |
| N | | | | (●) | | | | | | | Idle state of engine |
| Charging (N) | | ● | | | | | | | | | Charging at N range (electricity generation is controlled) |
| Starting (D range) | | | (●) | ● | | | | | | | Starting control of engine and MG |
| First forward speed | ● | | ● | ● | | | | | | | Regenerative braking possible when MG operates |
| Second forward speed | | ● | | ● | | | | | | | |
| Third forward speed | ● | | | ● | ● | | | | | | |
| Fourth forward speed | | ● | | | | ● | | | | | |
| Fifth forward speed | ● | | | | | ● | ● | | | | |
| Sixth forward speed | | ● | | | | | | ● | | | |
| Seventh forward speed | ● | | | | | | | ● | ● | | |

FIG.4

|  | CL1 | CL2 | 1st | 2nd | 3rd | 4th | 5th | 6th | 7th | Rev. | Note |
|---|---|---|---|---|---|---|---|---|---|---|---|
| REV |  | ● |  |  |  |  |  |  |  | ● | Regenerative braking possible when MG operates |
| Starting (REV) |  |  |  |  |  |  |  |  |  | ● | Starting control of engine and MG |
| N |  |  |  | (●) |  |  |  |  |  |  | Idle state of engine |
| Charging (N) |  | ● |  |  |  |  |  |  |  |  | Charging at N range (electricity generation is controlled) |
| Starting (D range) |  |  | (●) | ● |  |  |  |  |  |  | Starting control of engine and MG |
| First forward speed | ● |  | ● | (●) |  |  |  |  |  |  | Regenerative braking possible when MG operates |
| Second forward speed |  | ● |  | ● |  |  |  |  |  |  |  |
| Third forward speed | ● |  |  | (●) | ● |  |  |  |  |  |  |
| Fourth forward speed |  | ● |  |  |  | ● |  |  |  |  |  |
| Fifth forward speed | ● |  |  |  |  | (●) | ● |  |  |  |  |
| Sixth forward speed |  | ● |  |  |  |  |  | ● |  |  |  |
| Seventh forward speed | ● |  |  |  |  |  |  | (●) | ● |  |  |

POWER TRANSMITTING APPARATUS FOR VEHICLE

CROSS-REFERENCE TO RELATED APPLICATION

The present application claims priority of Korean Patent Application Numbers 10-2012-0060455 and 10-2013-0052732 filed Jun. 5, 2012 and May 9, 2013, respectively, the entire contents of which application is incorporated herein for all purposes by this reference.

BACKGROUND OF INVENTION

1. Field of Invention

The present invention relates to a power transmitting apparatus for a vehicle that may achieve smooth starting and shifting and may improve fuel economy and acceleration performance as a consequence of adding an electric supplementary drive unit and a torque converting device to a double clutch power transmitting apparatus.

2. Description of Related Art

Environmentally-friendly technique of vehicles is very important technique on which survival of future motor industry is dependent. Vehicle makers are focusing on development of environmentally-friendly vehicles so as to meet environment and fuel consumption regulations.

Some examples of future vehicle technique are an electric vehicle (EV) and a hybrid electric vehicle (HEV) that use electrical energy, and double clutch transmission (DCT) that improves efficiency and convenience.

In addition, the vehicle makers promote improvement of efficiency in a power delivery system so as to meet exhaust regulation of countries and improve fuel consumption performance. In order to improve efficiency of the power delivery system, the vehicle makers are trying to put an idle stop and go (ISG) system and a regenerative braking system to practical use.

The ISG system stops an engine when a vehicle stops and restarts the engine when the vehicle begins to run. The regenerative braking system operates a generator using kinetic energy of the vehicle instead of braking the vehicle by friction when the vehicle brakes, stores electrical energy generated at this time in a battery, and reuses the electrical energy when the vehicle runs.

In addition, the hybrid electric vehicle is a vehicle using more than two power sources, and more than two power sources are combined in various ways. Typically, the hybrid electric vehicle uses a gasoline engine or a diesel engine driven by fossil fuel and a motor/generator driven by electrical energy.

In addition, one example of a transmission applied to the hybrid electric vehicle is the DCT. According to the DCT, two clutches are applied to a manual transmission layout. Therefore, efficiency and convenience may be improved.

That is, the DCT achieves odd-numbered-speeds and even-numbered-speeds alternately by using two clutches. A mechanism achieving the odd-numbered-speeds and the even-numbered-speeds alternately improves shift feel so as to solve problems of a conventional manual transmission (MT) and an automated manual transmission (AMT).

However, the DCT has such problems that clutch damage and energy loss due to clutch slip may occur when starting, safety may not be secured since backward rolling due to clutch slip occurs excessively in hill-start, shift shock may be strong compared with an automatic transmission since shift time is controlled to be short due to thermal capacity of a clutch.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a power transmitting apparatus for vehicle having advantages of realizing smooth starting and shifting by adding an electric supplementary drive unit and a torque converting device to a double clutch power transmitting apparatus, improving fuel economy by enabling of regenerative braking, and improving acceleration performance by using torque of a motor/generator when acceleration.

A power transmitting apparatus for a vehicle according to an aspect of the present invention may include: an electric supplementary drive unit operated as a motor or a generator; a torque converting device including a planetary gear set having first, second, and third rotation elements, wherein the first rotation element is connected to the electric supplementary drive unit, the second rotation element is connected to an engine, and the third rotation element is operated as an output element; an input device including a first input shaft selectively connected to the second rotation element through one clutch and provided with at least one input gear fixedly disposed thereon, and a second input shaft disposed on the same axis as the first input shaft without rotational interference with the first input shaft, directly connected to the third rotation element, selectively connected to the second rotation element through the other clutch, and provide with at least one input gear fixedly disposed thereon; and a speed output device converting torque of the input device and outputting the converted torque.

The speed output device may include first and second output shafts disposed in parallel with the first and second input shafts, and a plurality of speed gears operably connected to the first output shaft or the second output shaft selectively through synchronizing modules disposed on the first and second output shafts.

The first input shaft may be a hollow shaft and the second input shaft may penetrate the first input shaft coaxially.

The electric supplementary drive unit may include: a rotor connected to the first rotation element of the torque converting device; and a stator enclosing the rotor and fixed to a transmission housing.

The planetary gear set may be a double pinion planetary gear set, the first rotation element may be a sun gear, the second rotation element may be a planet carrier, and the third rotation element may be a ring gear.

The first clutch may be disposed between the second rotation element of the torque converting device and the first input shaft so as to selectively connect the second rotation element with the first input shaft, and the second clutch may be disposed between the second rotation element of the torque converting device and the second input shaft so as to selectively connect the second rotation element with the second input shaft.

The at least one input gear fixedly disposed on the first input shaft may include a first input gear operated at a first forward speed, a second input gear operated at a second forward speed, and a third input gear operated at a fifth forward speed, wherein the first, second, and third input gears are disposed in a named sequence from a front side to a rear side of the first input shaft.

The at least one input gear fixedly disposed on the second input shaft may include a fourth input gear operated at a fourth forward speed, a fifth input gear operated at a second forward speed, a sixth input gear operated at a reverse speed, and a seventh input gear operated at a sixth forward speed, wherein the fourth, fifth, sixth, and seventh input gears are disposed in a named sequence from a front side to a rear side of the second input shaft.

The speed output device may include: a first speed output unit including a first output shaft disposed in parallel with the first and second input shafts, and first and second synchronizing modules disposed on the first output shaft, the first speed output unit selectively connecting four speed gears to the first output shaft by selective operation of the first and second synchronizing modules and outputting the torque as four speeds; a second speed output unit including a second output shaft disposed in parallel with the first and second input shafts, and third and fourth synchronizing modules disposed on the second output shaft, the second speed output unit selectively connecting another four speed gears to the second output shaft by selective operation of the third and fourth synchronizing modules and outputting the torque as another four speeds; and a reverse speed output unit including a reverse speed shaft and an idle gear disposed on the reverse speed shaft and engaged with any one input gear among the input gears on the second input shaft and any one speed gear among the speed gears on the second output shaft.

The first synchronizing module may selectively connect the first speed gear engaged with the first input gear or the third speed gear engaged with the third input gear to the first output shaft.

The second synchronizing module may selectively connect the second speed gear engaged with the fifth input gear or the sixth speed gear engaged with the seventh input gear to the first output shaft.

The third synchronizing module may selectively connect the seventh speed gear engaged with the second input gear or the fifth speed gear engaged with to the second output shaft.

The fourth synchronizing module may selectively connect the fourth speed gear engaged with the fourth input gear or a reverse speed gear engaged with the idle gear to the second output shaft.

The idle gear may be engaged with the sixth input gear of the second input shaft.

The second input shaft may be a hollow shaft and the first input shaft may penetrate the second input shaft coaxially.

The planetary gear set may be a double pinion planetary gear set, the first rotation element may be a planet carrier, the second rotation element may be a sun gear, and the third rotation element may be a ring gear.

The one clutch may be disposed between the sun gear and the first input shaft, and the other clutch may be disposed between the sun gear and the second input shaft.

The planetary gear train may be a single pinion planetary gear set, the first rotation element may be a sun gear, the second rotation element may be a ring gear, and the third rotation element may be a planet carrier.

The one clutch may be disposed between the ring gear and the first input shaft, and the other clutch may be disposed between the ring gear and the second input shaft.

The planetary gear train may be a single pinion planetary gear set, the first rotation element may be a ring gear, the second rotation element may be a sun gear, and the third rotation element may be a planet carrier.

The one clutch may be disposed between the sun gear and the first input shaft, and the other clutch may be disposed between the sun gear and the second input shaft.

The at least one input gear fixedly disposed on the second input shaft may include a first input gear operated at a second forward speed or a reverse speed, and a second input gear operated at a fourth forward speed or a sixth forward speed, wherein the first and second input gears are disposed in a named sequence from a front side to a rear side of the second input shaft.

The at least one input gear fixedly disposed on the first input shaft may include a third input gear operated at a seventh forward speed, a fourth input gear operated at a first forward speed, a fifth input gear operated at a fifth forward speed, and a sixth input gear operated at a third forward speed, wherein the third, fourth, fifth, and sixth input gears are disposed in a named sequence from a front side to a rear side of the first input shaft.

The speed output device may include: a first speed output unit including a first output shaft disposed in parallel with the first and second input shafts, and first and second synchronizing modules disposed on the first output shaft, the first speed output unit selectively connecting four speed gears to the first output shaft by selective operation of the first and second synchronizing modules and outputting the torque as four speeds; a second speed output unit including a second output shaft disposed in parallel with the first and second input shafts, and third and fourth synchronizing modules disposed on the second output shaft, the second speed output unit selectively connecting another four speed gears to the second output shaft by selective operation of the third and fourth synchronizing modules and outputting the torque as another four speeds; and a reverse speed output unit including a reverse speed shaft and an idle gear disposed on the reverse speed shaft and engaged with any one input gear among the input gears on the second input shaft and any one speed gear among the speed gears on the second output shaft.

The first synchronizing module may selectively connect the second speed gear engaged with the first input gear or the sixth speed gear engaged with the second input gear to the first output shaft.

The second synchronizing module may selectively connect the first speed gear engaged with the fourth input gear or the third speed gear engaged with the sixth input gear to the first output shaft.

The third synchronizing module may selectively connect the reverse speed gear engaged with the idle gear or the fourth speed gear engaged with the second input gear to the second output shaft.

The idle gear may be engaged with the first input gear of the second input shaft.

The idle gear may include a large diameter gear and a small diameter gear disposed on the reverse speed shaft, wherein the large diameter gear is engaged with the first input gear and the small diameter gear is engaged with the reverse speed gear.

The fourth synchronizing module may selectively connect the seventh speed gear engaged with the third input gear or the fifth speed gear engaged with the fifth input gear to the second output shaft.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 2 is an operational chart of the power transmitting apparatus of FIG. 1.

FIG. 4 is an operational chart of the power transmitting apparatus of FIG. 3.

DETAILED DESCRIPTION

Figure 1:
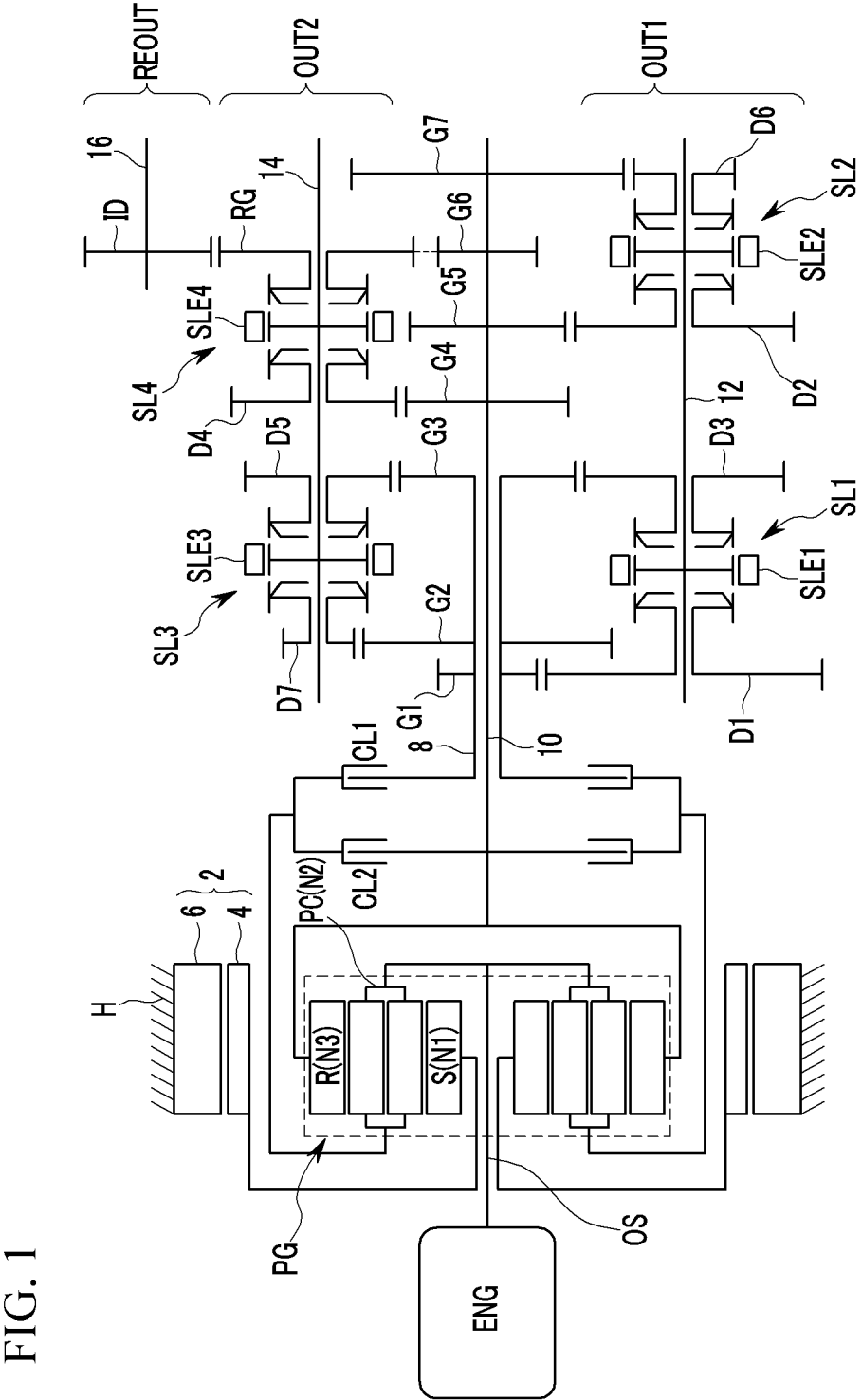
FIG. 1 is a schematic diagram of an exemplary power transmitting apparatus for a vehicle according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Description of components that are not necessary for explaining the various embodiments will be omitted, and the same constituent elements are denoted by the same reference numerals in this specification.

In the detailed description, ordinal numbers are used for distinguishing constituent elements having the same terms, and have no specific meanings.

FIG. 1 is a schematic diagram of a power transmitting apparatus for a vehicle according to various embodiments of the present invention.

Referring to FIG. 1, a power transmitting apparatus according to various embodiments of the present invention includes an electric supplementary drive unit 2, a torque converting device PG, an input device 8, 10, a variable connecting device CL1 and CL2, and a speed output device OUT1, OUT2 and REOUT.

The electric supplementary drive unit includes a motor/generator 2 used in a conventional electric vehicle, and the motor/generator 2 includes a rotor 4 and a stator 6 so as to function as a motor and a generator simultaneously.

The rotor 4 is connected to any one rotation element of the torque converting device, and the stator 6 is fixed to a transmission housing H.

The torque converting device includes a planetary gear set PG. In various embodiments of the present invention, a double pinion planetary gear set having three rotation elements is used as the torque converting device.

The three rotation elements are a first rotation element N1 consisting of a sun gear S, a second rotation element N2 consisting of a planet carrier PC, and a third rotation element N3 consisting of a ring gear R.

The first rotation element N1 is connected to the rotor 4 so as to receive torque of the rotor 4 or transmit torque to the rotor 4.

The second rotation element N2 is directly connected to an output shaft OS of an engine ENG that is power source so as to be operated as an input element. In addition, the second rotation element N2 transmits a rotation speed of the output shaft OS to the speed output device.

The third rotation element N3 is operated as an output element transmitting torque to the speed output device.

The input device includes a first input shaft 8 and a second input shaft 10.

The first input shaft 8 is a hollow shaft, and a front end portion of the input shaft 8 is selectively connected to the second rotation element N2 of the torque converting device. The second input shaft 10 is inserted in the first input shaft 8 without rotational interference with the first input shaft 8. A front end portion of the second input shaft 10 is directly connected to the third rotation element N3 of the torque converting device.

First, second, and third input gears G1, G2, and G3 are disposed on the first input shaft 8 with predetermined distances. The first, second, and third input gears G1, G2, and G3 are disposed in a sequence of the first, second, and third input gears G1, G2, and G3 from a front side to a rear side.

Fourth, fifth, sixth, and seventh input gears G4, G5, G6, and G7 are disposed on the second input shaft 10 with predetermined distances. The fourth, fifth, sixth, and seventh input gears G4, G5, G6, and G7 are disposed at a rear portion of the second input shaft 10 penetrating through the first input shaft 8, and are disposed in a sequence of the fourth, fifth, sixth, and seventh input gears G4, G5, G6, and G7 from a front side to a rear side.

The first, the second, third, fourth, fifth, sixth, and seventh input gears G1, G2, G3, G4, G5, G6, and G7 input gears operating at each speed. That is, the first input gear G1 is operated at a first forward speed, the second input gear G2 is operated at a seventh forward speed, the third input gear G3 is operated at a third forward speed and a fifth forward speed, the fourth input gear G4 is operated at a fourth forward speed, the fifth input gear G5 is operated at a second forward speed, the sixth input gear G6 is operated at a reverse speed, and the seventh input gear G7 is operated at a sixth forward speed.

In addition, the input gears for odd-numbered-speeds are disposed on the first input shaft 8 and the input gears for even-numbered-speeds and a reverse speed are disposed on the second input shaft 10.

The variable connecting device includes a first clutch CL1 and a second clutch CL2.

The first clutch CL1 is disposed between the first input shaft 8 and the second rotation element N2 and selectively transmits the torque of the torque converting device to the first input shaft 8.

The second clutch CL2 is disposed between the second input shaft 10 and the second rotation element N2 and selectively makes the planetary gear set PG that is the torque converting device be a direct-coupling state.

The first and second clutches CL1 and CL2 may be conventional multi-plate clutches of wet type and are controlled by a hydraulic control system. In addition, the first and second clutches CL1 and CL2 may be multi-plate clutches of dry type.

The speed output device is adapted to receive torque from each input gear, convert the torque, and output the converted torque. The speed output device includes first and second speed output units OUT1 and OUT2 and a reverse speed output unit REOUT disposed apart from by predetermined distances and in parallel with the first and second input shafts 8, 10.

The first speed output unit OUT1 includes a first output shaft 12 disposed apart from and in parallel with the first and second input shafts 8, 10, first, second, third and sixth speed gears D1, D2, D3 and D6, a first synchronizing module SL1 disposed on the first output shaft 12 and selectively connecting the first speed gear D1 or the third speed gear D3 to the first output shaft 12, and a second synchronizing module SL2 disposed on the first output shaft 12 and selectively connecting the second speed gear D2 or the sixth speed gear D6 to the first output shaft 12.

The first speed gear D1 is engaged with the first input gear G1, and the third speed gear D3 is engaged with the third input gear G3.

The second speed gear D2 is engaged with the fifth input gear G5, and the sixth speed gear D6 is engaged with the seventh input gear G7.

In addition, the torque converted by the first speed output unit OUT1 is transmitted to a conventional differential device through a first output gear mounted at a front end portion or a rear end portion of the first output shaft 12.

The second speed output unit OUT2 includes a second output shaft 14 disposed apart from and in parallel with the first and second input shafts 8, 10, fourth, fifth and seventh speed gears D4, D5 and D7 and a reverse speed gear RG, a third synchronizing module SL3 disposed on the second output shaft 14 and selectively connecting the fifth speed gear D5 or the seventh speed gear D7 to the second output shaft 14, and a fourth synchronizing module SL4 disposed on the second output shaft 14 and selectively connecting the fourth speed gear D4 or the reverse speed gear RG to the second output shaft 14.

The seventh speed gear D7 is engaged with the second input gear G2, and the fifth speed gear D5 is engaged with the third input gear G3.

The fourth speed gear D4 is engaged with the fourth input gear G4, and the reverse speed gear RG is engaged with an idle gear ID of the reverse speed output unit REOUT.

In addition, the torque converted by the second speed output unit OUT2 is transmitted to the conventional differential device through a second output gear mounted at a front end portion or a rear end portion of the second output shaft 14.

The reverse speed output unit REOUT includes the idle gear ID integrally formed with a reverse speed shaft 16.

The idle gear ID is engaged simultaneously with the sixth input gear G6 and the reverse speed gear RG. Therefore, torque of the sixth input gear G6 is transmitted to the reverse speed gear RG through the idle gear ID when the second input shaft 10 rotates, and the converted torque is transmitted to the conventional differential device through the second output gear of the second output shaft 14. At this time, a reverse rotation speed is output.

Since the first, second, third, and fourth synchronizing modules SL1, SL2, SL3, and SL4 are well known to a person of an ordinary skill in the art, detailed description thereof will be omitted. In addition, sleeves SLE1, SLE2, SLE3, and SLE4 applied respectively to the first, second, third, and fourth synchronizing modules SL1, SL2, SL3, and SL4, as well know to a person of an ordinary skill in the art, are operated by additional actuators and the actuators are controlled by a transmission control unit.

FIG. 2 is an operational chart of the power transmitting apparatus of FIG. 1.

Referring to FIG. 2, the first clutch CL1 is operated at the odd-numbered-speeds, and the second clutch CL2 is operated at the reverse speed REV and the even-numbered-speeds and when charging. The sleeves SLE1, SLE2, SLE3, and SLE4 of the first, second, third, and fourth synchronizing modules SL1, SL2, SL3, and SL4 are operably coupled to the gears of D1, D2, D3, D4, D5, D6, D7, and RG of corresponding speeds.

Neutral

At a neutral N state, the first output shaft 12 and the second speed gear D2 are operably connected by the sleeve SLE2 of the second synchronizing module SL2 or any synchronizing module is not operated.

The reason why the first output shaft 12 and the second speed gear D2 are operably connected at the neutral N state is that the vehicle is started not at the first forward speed but at the second forward speed.

In addition, when a battery is charged at the neutral N state, the second clutch CL2 is operated so as to make the torque converting device be the direct-coupling state. In this case, the torque of the engine is transmitted to the rotor 4 so as to charge the battery effectively.

Reverse Speed

When the vehicle is started at the reverse speed REV, the second output shaft 14 and the reverse speed gear RG are operably connected through the sleeve SLE4 of the fourth synchronizing module SL4 before the second clutch CL2 is operated, and starting control of the engine ENG and the motor/generator 2 is executed. After that, a shift to the reverse speed REV is completed by operation of the second clutch CL2.

First Forward Speed

The first output shaft 12 and the second speed gear D2 are operably connected by the sleeve SLE2 of the second synchronizing module SL2 when the vehicle is started in a D range, and the starting control of the engine ENG and the motor/generator 2 is executed.

After the first output shaft 12 and the first speed gear D1 are operably connected by the sleeve SLE1 of the first synchronizing module SL1 during the vehicle is started, a shift to the first forward speed is completed by operating the first clutch CL1.

Second Forward Speed

The first clutch CL1 that was operated at the first forward speed is released and the sleeve SLE1 of the first synchronizing module SL1 is controlled to be a neutral position at the second forward speed. After that, if the second clutch CL2 is operated, a shift to the second forward speed is completed.

Third Forward Speed

The second clutch CL2 that was operated at the second forward speed is released and the first output shaft 12 and the third speed gear D3 are operably connected by the sleeve SLE1 of the first synchronizing module SL1. After that, if the first clutch CL1 is operated, a shift to the third forward speed is completed.

At this time, the first output shaft 12 and the second speed gear D2 are operably connected by the sleeve SLE2 of the second synchronizing module SL2, but it does not have any effect on shifting.

Fourth Forward Speed

The first clutch CL1 that was operated at the third forward speed is released and the sleeve SLE1 of the first synchronizing module SL1 and the sleeve SLE2 of the second synchronizing module SL2 are moved to their neutral positions. After that, if the second output shaft 14 and the fourth speed gear D4 are operably connected by the sleeve SLE4 of the fourth synchronizing module SL4 and the second clutch CL2 is operated, a shift to the fourth forward speed is completed.

Fifth Forward Speed

The second clutch CL2 that was operated at the fourth forward speed is released and the second output shaft 14 and the fifth speed gear D5 are operably connected by the sleeve SLE3 of the third synchronizing module SL3. After that, if the first clutch CL1 is operated, a shift to the fifth forward speed is completed.

At this time, the second output shaft 14 and the fourth speed gear D4 are operably connected by the sleeve SLE4 of the fourth synchronizing module SL4, but it does not have any effect on shifting.

Sixth Forward Speed

The first clutch CL1 that was operated at the fifth forward speed is released and the sleeve SLE3 of the third synchronizing module SL3 and the sleeve SLE4 of the fourth synchronizing module SL4 are moved to their neutral positions. After that, if the first output shaft 12 and the sixth speed gear D6 are operably connected by the sleeve SLE2 of the second synchronizing module SL2 and the second clutch CL2 is operated, a shift to the sixth forward speed is completed.

Seventh Forward Speed

The second clutch CL2 that was operated at the sixth forward speed is released and the second output shaft 14 and the seventh speed gear D7 are operably connected by the sleeve SLE3 of the third synchronizing module SL3. After that, if the first clutch CL1 is operated, a shift to the seventh forward speed is completed.

At this time, the first output shaft 12 and the sixth speed gear D6 are operably connected by the sleeve SLE2 of the second synchronizing module SL2, but it does not have any effect on shifting.

In addition, if the motor/generator 2 that is the electric supplementary drive unit is driven in a state that the second clutch CL2 is not operated, the torque converting device changes and outputs the torque according to rotation speeds of the motor/generator 2 and the engine ENG.

If the motor/generator 2 that is the electric supplementary drive unit is operated when the vehicles runs at the forward speeds and the reverse speed, regenerative braking is possible.

Figure 3:
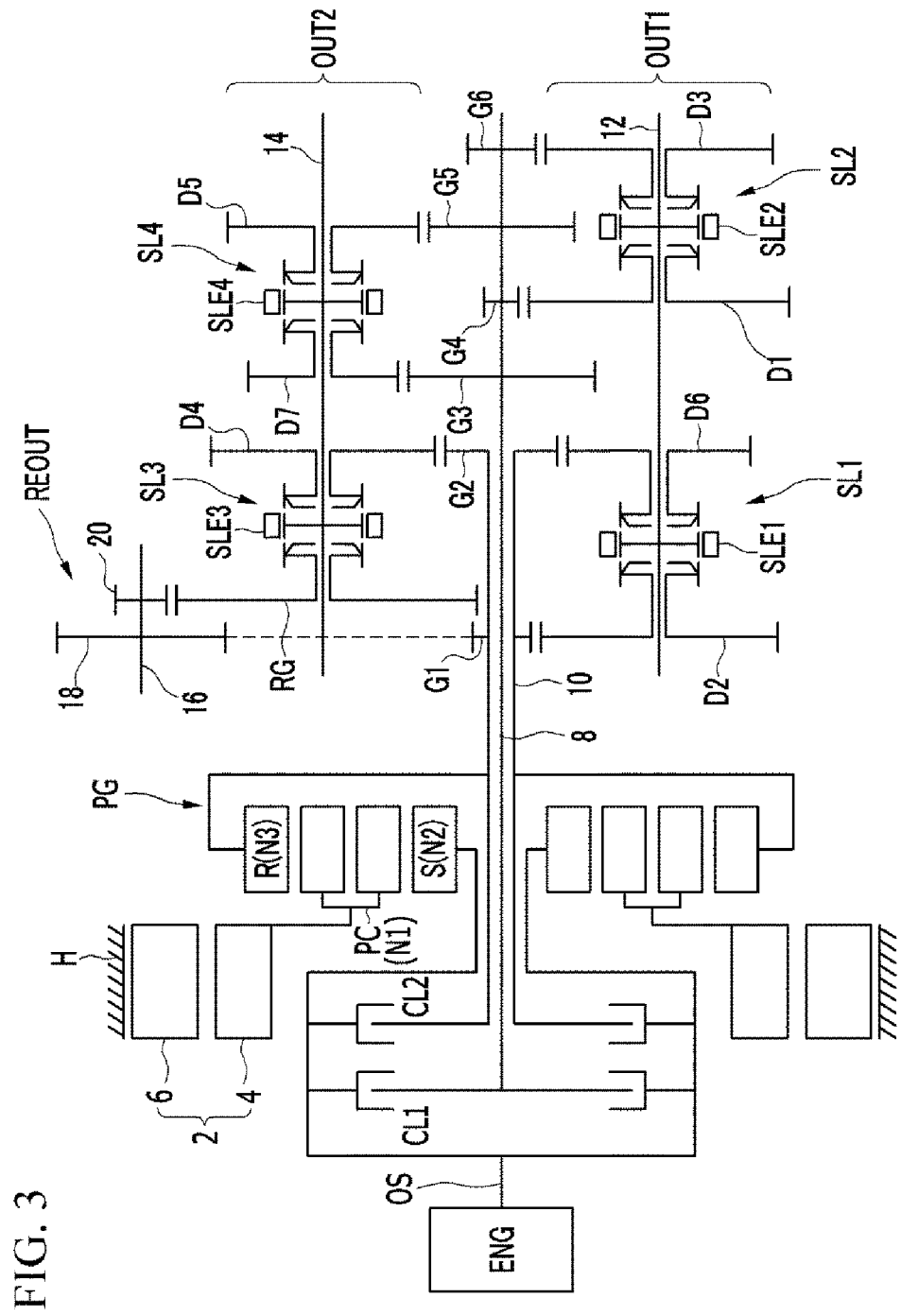
FIG. 3 is a schematic diagram of an exemplary power transmitting apparatus for a vehicle according to the present invention.

FIG. 3 is a schematic diagram of a power transmitting apparatus for a vehicle according to various embodiments of the present invention.

Referring to FIG. 3, a power transmitting apparatus according to various embodiments of the present invention includes an electric supplementary drive unit 2, a torque converting device PG, an input device 8, 10, a variable connecting device CL1 and CL2, and a speed output device OUT1, OUT2 and REOUT.

Since the power transmitting apparatus according to FIG. 3 is similar to that of FIG. 1, differences will be described.

The torque converting device includes a planetary gear set PG. In various embodiments of the present invention, a double pinion planetary gear set having three rotation elements is used as the torque converting device.

The three rotation elements are a first rotation element N1 consisting of a planet carrier PC, a second rotation element N2 consisting of a sun gear S, and a third rotation element N3 consisting of a ring gear R.

The input device includes a first input shaft 8 and a second input shaft 10.

The second input shaft 10 is a hollow shaft, and a front end portion of the second input shaft 10 is directly connected to the third rotation element N3 of the torque converting device and is selectively connected to the second rotation element N2 of the torque converting device. The first input shaft 8 is inserted in the second input shaft 10 without rotational interference with the second input shaft 10. A front end portion of the first input shaft 8 is selectively connected to the second rotation element N2 of the torque converting device.

First and second input gears G1 and G2 are disposed on the second input shaft 10 with a predetermined distance.

Third, fourth, fifth, and sixth input gears G3, G4, G5, and G6 are disposed on the first input shaft 8 with predetermined distances. The third, fourth, fifth, and sixth input gears G3, G4, G5, and G6 are disposed at a rear portion of the first input shaft 8 penetrating through the second input shaft 10, and are disposed in a sequence of the third, fourth, fifth, and sixth input gears G3, G4, G5, and G6 from a front side to a rear side.

The first, second, third, fourth, fifth, and sixth input gears G1, G2, G3, G4, G5, and G6 are input gears operating at each speed. That is, the first input gear G1 is operated at a second forward speed and a reverse speed, the second input gear G2 is operated at a fourth forward speed and a sixth forward speed, the third input gear G3 is operated at a seventh forward speed, the fourth input gear G4 is operated at a first forward speed, the fifth input gear G5 is operated at a fifth forward speed, and the sixth input gear G6 is operated at a third forward speed.

In addition, the input gears for odd-numbered-speeds are disposed on the first input shaft 8 and the input gears for even-numbered-speeds and a reverse speed are disposed on the second input shaft 10.

The variable connecting device includes a first clutch CL1 and a second clutch CL2.

The first clutch CL1 is disposed between the first input shaft 8 and the second rotation element N2 and selectively transmits the torque of the torque converting device to the first input shaft 8.

The second clutch CL2 is disposed between the second input shaft 10 and the second rotation element N2 and selectively makes the planetary gear set PG that is the torque converting device be a direct-coupling state.

The speed output device is adapted to receive torque from each input gear, convert the torque, and output the converted torque. The speed output device includes first and second speed output units OUT1 and OUT2 and a reverse speed output unit REOUT disposed apart from by predetermined distances and in parallel with the first and second input shafts 8, 10.

The first speed output unit OUT1 includes a first output shaft 12 disposed apart from and in parallel with the first and second input shafts 8, 10, first, second, third and sixth speed gears D1, D2, D3 and D6, a first synchronizing module SL1 disposed on the first output shaft 12 and selectively connecting the second speed gear D2 or the sixth speed gear D6 to the first output shaft 12, and a second synchronizing module SL2 disposed on the first output shaft 12 and selectively connecting the first speed gear D1 or the third speed gear D3 to the first output shaft 12.

The second speed gear D2 is engaged with the first input gear G1, and the sixth speed gear D6 is engaged with the second input gear G2.

The first speed gear D1 is engaged with the fourth input gear G4, and the third speed gear D3 is engaged with the sixth input gear G6.

In addition, the torque converted by the first speed output unit OUT1 is transmitted to a conventional differential device through a first output gear mounted at a front end portion or a rear end portion of the first output shaft 12.

The second speed output unit OUT2 includes a second output shaft 14 disposed apart from and in parallel with the first and second input shafts 8, 10, fourth, fifth and seventh speed gears D4, D5 and D7 and a reverse speed gear RG, a third synchronizing module SL3 disposed on the second output shaft 14 and selectively connecting the reverse speed gear RG or the fourth speed gear D4 to the second output shaft 14, and a fourth synchronizing module SL4 disposed on the second output shaft 14 and selectively connecting the fifth speed gear D5 or the seventh speed gear D7 to the second output shaft 14.

The reverse speed gear RG is engaged with an idle gear of the reverse speed output unit REOUT, and the fourth speed gear D7 is engaged with the second input gear G2.

The fifth speed gear D5 is engaged with the fifth input gear G5, and the seventh speed gear D7 is engaged with the third input gear G3.

In addition, the torque converted by the second speed output unit OUT2, is transmitted to the conventional differential device through a second output gear mounted at a front end portion or a rear end portion of the second output shaft 14.

The reverse speed output unit REOUT includes a reverse speed shaft 16 and the idle gear including a large diameter gear 18 and a small diameter gear 20 and disposed on the reverse speed shaft 16.

The reverse speed shaft 16 is disposed in parallel with the first and second output shafts 12 and 14, the large diameter gear 18 is engaged with the first input gear G1, and the small diameter gear 20 is always engaged with the reverse speed gear RG.

Therefore, torque of the first input gear G1 is transmitted to the reverse speed gear RG through the large diameter gear 18 and the small diameter gear 20, and the converted torque is transmitted to the conventional differential device through the second output gear of the second output shaft 14. At this time, a reverse rotation speed is output.

Since the first, second, third, and fourth synchronizing modules SL1, SL2, SL3, and SL4 are well known to a person of an ordinary skill in the art, detailed description thereof will be omitted. In addition, sleeves SLE1, SLE2, SLE3, and SLE4 applied respectively to the first, second, third, and fourth synchronizing modules SL1, SL2, SL3, and SL4, as well know to a person of an ordinary skill in the art, are operated by additional actuators and the actuators are controlled by a transmission control unit.

FIG. 4 is an operational chart of the power transmitting apparatus of FIG. 3.

Referring to FIG. 4, the first clutch CL1 is operated at the odd-numbered-speeds, and the second clutch CL2 is operated at the reverse speed REV and the even-numbered-speeds and when charging. The sleeves SLE1, SLE2, SLE3, and SLE4 of the first, second, third, and fourth synchronizing modules SL1, SL2, SL3, and SL4 are operably coupled to the gears of D1, D2, D3, D4, D5, D6, D7, and RG of corresponding speeds.

Neutral

At a neutral N state, the first output shaft 12 and the second speed gear D2 are operably connected by the sleeve SLE1 of the first synchronizing module SL1 or any synchronizing module is not operated.

The reason why the first output shaft 12 and the second speed gear D2 are operably connected at the neutral N state is that the vehicle is started not at the first forward speed but at the second forward speed.

In addition, when a battery is charged at the neutral N state, the second clutch CL2 is operated so as to make the torque converting device be the direct-coupling state. In this case, the torque of the engine is transmitted to the rotor 4 so as to charge the battery effectively.

Reverse Speed

When the vehicle is started at the reverse speed REV, the second output shaft 14 and the reverse speed gear RG are operably connected through the sleeve SLE3 of the third synchronizing module SL3, and starting control of the engine ENG and the motor/generator 2 is executed. After that, a shift to the reverse speed REV is completed by operation of the second clutch CL2.

First Forward Speed

The first output shaft 12 and the second speed gear D2 are operably connected by the sleeve SLE1 of the first synchronizing module SL1 when the vehicle is started in a D range, and the starting control of the engine ENG and the motor/generator 2 is executed.

After the first output shaft 12 and the first speed gear D1 are operably connected by the sleeve SLE2 of the second synchronizing module SL2 during the vehicle is started, a shift to the first forward speed is completed by operating the first clutch CL1.

Second Forward Speed

The first clutch CL1 that was operated at the first forward speed is released and the sleeve SLE2 of the second synchronizing module SL2 is controlled to be a neutral position at the second forward speed. After that, if the second clutch CL2 is operated, a shift to the second forward speed is completed.

Third Forward Speed

The second clutch CL2 that was operated at the second forward speed is released and the first output shaft 12 and the third speed gear D3 are operably connected by the sleeve SLE2 of the second synchronizing module SL2. After that, if the first clutch CL1 is operated, a shift to the third forward speed is completed.

At this time, the first output shaft 12 and the second speed gear D2 are operably connected by the sleeve SLE2 of the first synchronizing module SL1, but it does not have any effect on shifting.

Fourth Forward Speed

The first clutch CL1 that was operated at the third forward speed is released and the sleeve SLE1 of the first synchronizing module SL1 and the sleeve SLE2 of the second synchronizing module SL2 are moved to their neutral positions. After that, if the second output shaft 14 and the fourth speed gear D4 are operably connected by the sleeve SLE3 of the fourth synchronizing module SL3 and the second clutch CL2 is operated, a shift to the fourth forward speed is completed.

Fifth Forward Speed

The second clutch CL2 that was operated at the fourth forward speed is released and the second output shaft 14 and the fifth speed gear D5 are operably connected by the sleeve SLE4 of the fourth synchronizing module SL4. After that, if the first clutch CL1 is operated, a shift to the fifth forward speed is completed.

At this time, the second output shaft 14 and the fourth speed gear D4 are operably connected by the sleeve SLE3 of the third synchronizing module SL3, but it does not have any effect on shifting.

Sixth Forward Speed

The first clutch CL1 that was operated at the fifth forward speed is released and the sleeve SLE3 of the third synchronizing module SL3 and the sleeve SLE4 of the fourth synchronizing module SL4 are moved to their neutral positions. After that, if the first output shaft 12 and the sixth speed gear D6 are operably connected by the sleeve SLE1 of the first synchronizing module SL1 and the second clutch CL2 is operated, a shift to the sixth forward speed is completed.

Seventh Forward Speed

The second clutch CL2 that was operated at the sixth forward speed is released and the second output shaft 14 and the seventh speed gear D7 are operably connected by the sleeve SLE4 of the fourth synchronizing module SL4. After that, if the first clutch CL1 is operated, a shift to the seventh forward speed is completed.

At this time, the first output shaft 12 and the sixth speed gear D6 are operably connected by the sleeve SLE1 of the first synchronizing module SL1, but it does not have any effect on shifting.

In addition, if the motor/generator 2 that is the electric supplementary drive unit is driven in a state that the second clutch CL2 is not operated, the torque converting device changes and outputs the torque according to rotation speeds of the motor/generator 2 and the engine ENG.

If the motor/generator 2 that is the electric supplementary drive unit is operated when the vehicles runs at the forward speeds and the reverse speed, regenerative braking is possible.

Figure 5:
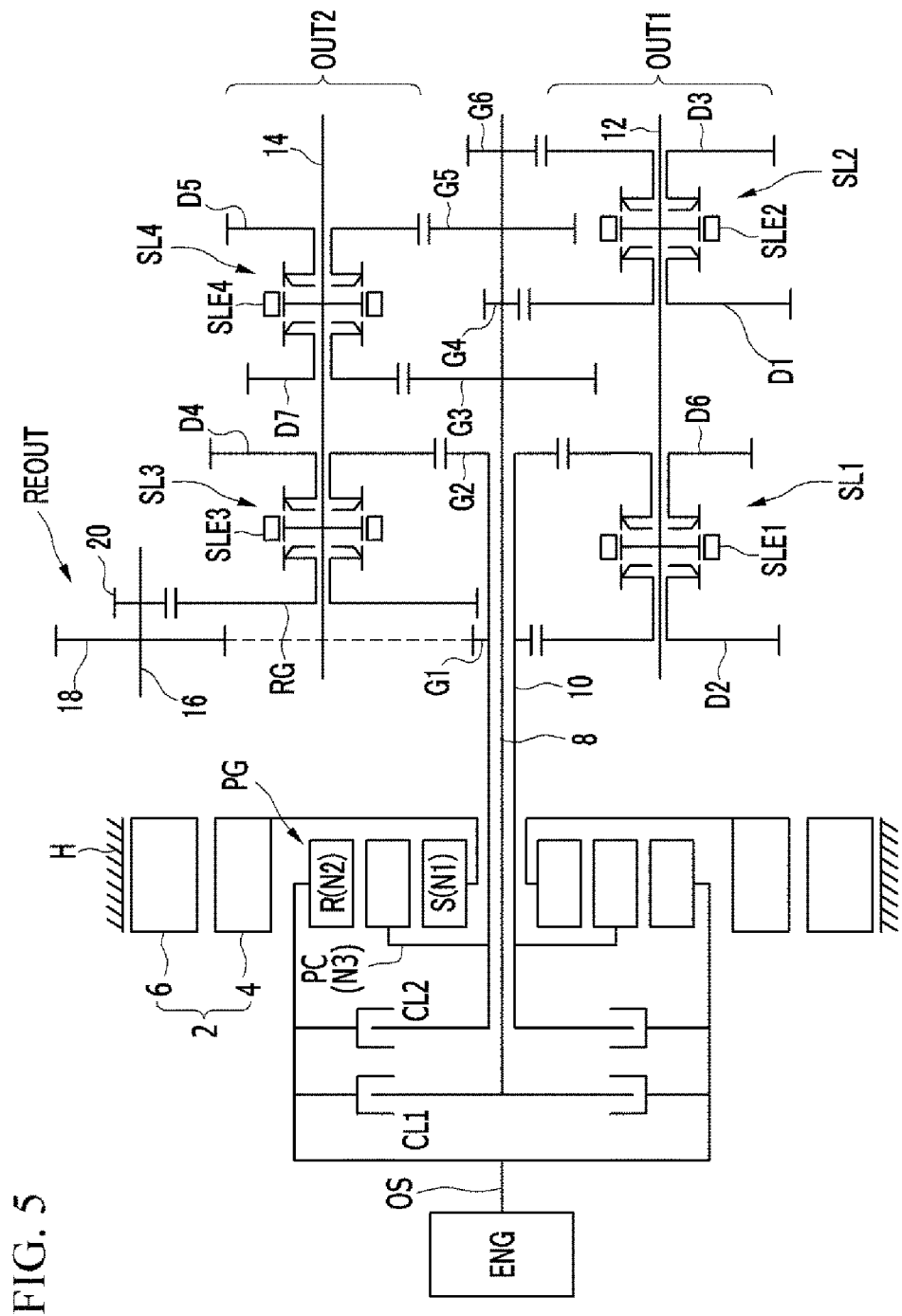
FIG. 5 is a schematic diagram of an exemplary power transmitting apparatus for a vehicle according to the present invention.

FIG. 5 is a schematic diagram of a power transmitting apparatus for a vehicle according to various embodiments of the present invention.

Referring to FIG. 5, a power transmitting apparatus according to various embodiments of the present invention uses a single pinion planetary gear train as the planetary gear train PG of the torque converting device.

According to various embodiments of the present invention, the sun gear S is the first rotation element N1, the ring gear R is the second rotation element N2, and the planet carrier PC is the third rotation element N3.

At this time, the first clutch CL1 is disposed between the ring gear R and the first input shaft 8 and the second clutch CL2 is disposed between the ring gear R and the second input shaft 10.

Since functions of the power transmitting apparatus of FIG. 5 are similar to those of FIG. 3 except a type of the planetary gear train PG, detailed description thereof will be omitted.

Figure 6:
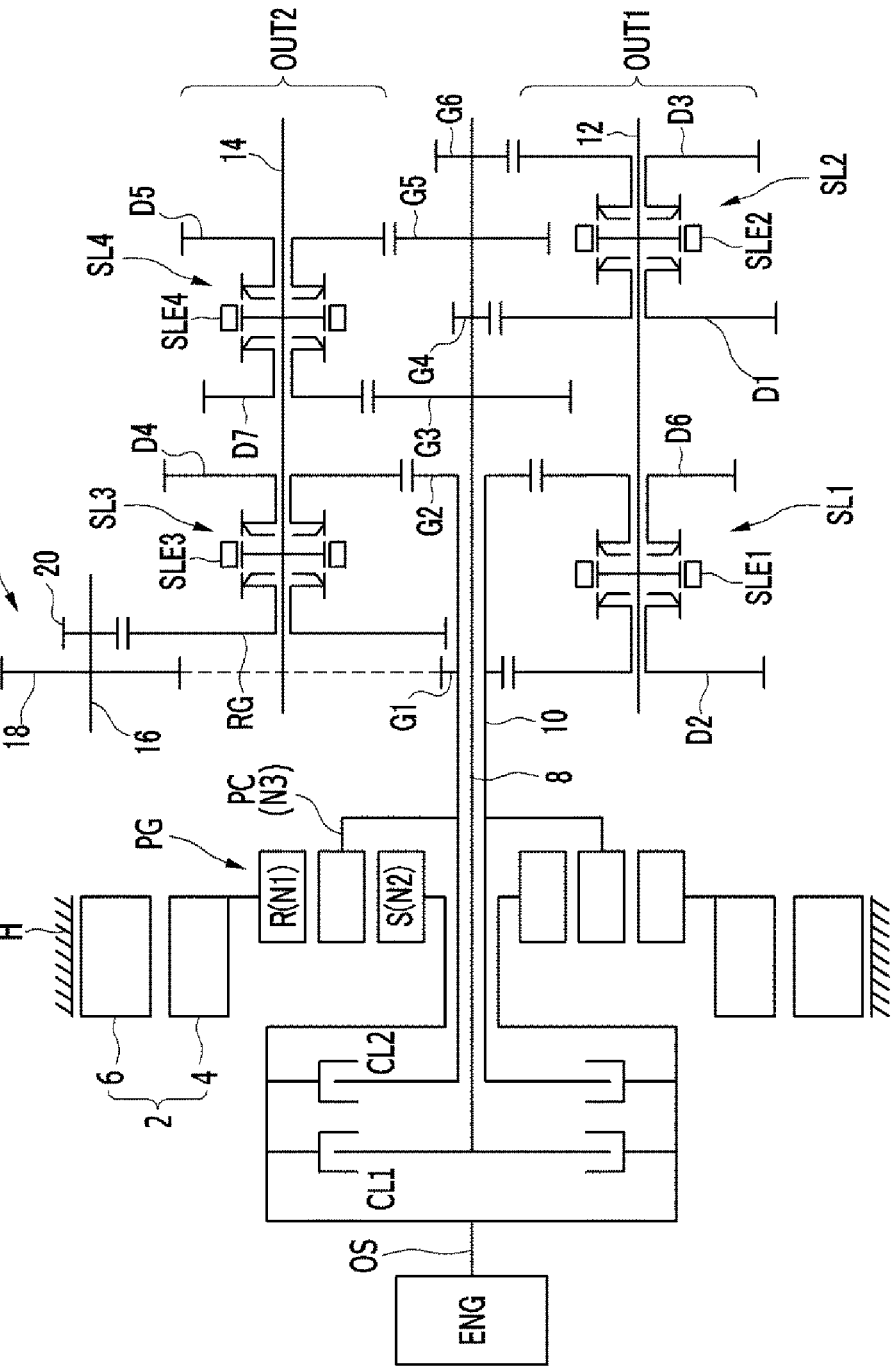
FIG. 6 is a schematic diagram of the power transmitting apparatus of FIG. 5.

FIG. 6 is a schematic diagram of the power transmitting apparatus of FIG. 5.

Referring to FIG. 6, a power transmitting apparatus according to various embodiments of the present invention uses a single pinion planetary gear train as the planetary gear train PG of the torque converting device.

According to various embodiments of the present invention, therefore, the ring gear R is the first rotation element N1, the sun gear S is the second rotation element N2, and the planet carrier PC is the third rotation element N3.

At this time, the first clutch CL1 is disposed between the sun gear S and the first input shaft 8 and the second clutch CL2 is disposed between the sun gear S and the second input shaft 10.

Since functions of the power transmitting apparatus of FIG. 5 are similar to those of FIG. 3 except a type of the planetary gear train PG, detailed description thereof will be omitted.

According to various embodiments of the present invention, starting and shifting are achieved by using the motor/generator that is the electric supplementary drive unit and the planetary gear set that is the torque converting device. Therefore, smooth starting and shifting may be achieved.

Since clutch slip may be minimized and regenerative braking is possible at deceleration, fuel economy may be improved.

In addition, as the motor/generator that is the electric supplementary drive unit assists torque at acceleration, acceleration performance may be improved.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A power transmitting apparatus for a vehicle, comprising:
an electric supplementary drive unit operated as a motor or a generator;
a torque converting device including a planetary gear set having first, second, and third rotation elements, wherein the first rotation element is connected to the electric supplementary drive unit, the second rotation element is directly connected to an engine, and the third rotation element is operated as an output element;
an input device including:
a first input shaft selectively connected to the second rotation element through a first clutch and provided with a first input gear assembly fixedly disposed thereon;
a second input shaft coaxially disposed with the first input shaft without rotational interference with the first input shaft, directly connected to the third rotation element, selectively connected to the second rotation element through a second clutch, and provided with a second input gear assembly fixedly disposed thereon; and
a speed output device converting torque of the input device and outputting the converted torque.

2. The power transmitting apparatus of claim 1, wherein the speed output device comprises first and second output shafts disposed in parallel with the first and second input shafts, and a plurality of speed gears operably connected to the first output shaft or the second output shaft selectively through synchronizing modules disposed on the first or second output shafts.

3. The power transmitting apparatus of claim 2, wherein the first input shaft is a hollow shaft and the second input shaft penetrates the first input shaft coaxially.

4. The power transmitting apparatus of claim 2, wherein the electric supplementary drive unit comprises:
a rotor connected to the first rotation element of the torque converting device; and
a stator enclosing the rotor and fixed to a transmission housing.

5. The power transmitting apparatus of claim 2, wherein the planetary gear set is a double pinion planetary gear set, the first rotation element is a sun gear, the second rotation element is a planet carrier, and the third rotation element is a ring gear.

6. The power transmitting apparatus of claim 2, wherein the first clutch is disposed between the second rotation element of the torque converting device and the first input shaft so as to selectively connect the second rotation element with the first input shaft, and the second clutch is disposed between the second rotation element of the torque converting device and the second input shaft so as to selectively connect the second rotation element with the second input shaft.

7. The power transmitting apparatus of claim 2, wherein the first input gear assembly fixedly disposed on the first input shaft includes a first input gear operated at a first forward speed, a second input gear operated at a second forward speed, and a third input gear operated at a fifth forward speed, wherein the first, second, and third input gears are disposed in a named sequence from a front side to a rear side of the first input shaft, and wherein the second input gear assembly fixedly disposed on the second input shaft includes a fourth input gear operated at a fourth forward speed, a fifth input gear operated at a second forward speed, a sixth input gear operated at a reverse speed, and a seventh input gear operated at a sixth forward speed, wherein the fourth, fifth, sixth, and seventh input gears are disposed in a named sequence from a front side to a rear side of the second input shaft.

8. The power transmitting apparatus of claim 7, wherein the speed output device comprises:

a first speed output unit including a first output shaft disposed in parallel with the first and second input shafts, and first and second synchronizing modules disposed on the first output shaft, the first speed output unit selectively connecting four speed gears to the first output shaft by selective operation of the first and second synchronizing modules and outputting the torque as four speeds;

a second speed output unit including a second output shaft disposed in parallel with the first and second input shafts, and third and fourth synchronizing modules disposed on the second output shaft, the second speed output unit selectively connecting another four speed gears to the second output shaft by selective operation of the third and fourth synchronizing modules and outputting the torque as another four speeds; and a reverse speed output unit including a reverse speed shaft and an idle gear disposed on the reverse speed shaft and engaged with any one input gear among the input gears on the second input shaft and any one speed gear among the speed gears on the second output shaft.

9. The power transmitting apparatus of claim 8, wherein the first synchronizing module selectively connects a first speed gear engaged with the first input gear or a third speed gear engaged with the third input gear to the first output shaft.

10. The power transmitting apparatus of claim 8, wherein the second synchronizing module selectively connects the second speed gear engaged with the fifth input gear or a sixth speed gear engaged with the seventh input gear to the first output shaft.

11. The power transmitting apparatus of claim 8, wherein the third synchronizing module selectively connects a seventh speed gear engaged with the second input gear or a fifth speed gear engaged with to the second output shaft.

12. The power transmitting apparatus of claim 8, wherein the fourth synchronizing module selectively connects the fourth speed gear engaged with the fourth input gear or a reverse speed gear engaged with the idle gear to the second output shaft.

13. The power transmitting apparatus of claim 12, wherein the idle gear is engaged with the sixth input gear of the second input shaft.

14. The power transmitting apparatus of claim 2, wherein the second input shaft is a hollow shaft and the first input shaft is coaxially contained within the second input shaft.

15. The power transmitting apparatus of claim 14, wherein the planetary gear set is a double pinion planetary gear set, the first rotation element is a planet carrier, the second rotation element is a sun gear, and the third rotation element is a ring gear.

16. The power transmitting apparatus of claim 15, wherein the first clutch is disposed between the sun gear and the first input shaft, and the second clutch is disposed between the sun gear and the second input shaft.

17. The power transmitting apparatus of claim 14, wherein the planetary gear set is a single pinion planetary gear set, the first rotation element is a sun gear, the second rotation element is a ring gear, and the third rotation element is a planet carrier.

18. The power transmitting apparatus of claim 17, wherein the first clutch is disposed between the ring gear and the first input shaft, and the second clutch is disposed between the ring gear and the second input shaft.

19. The power transmitting apparatus of claim 14, wherein the planetary gear train is a single pinion planetary gear set, the first rotation element is a ring gear, the second rotation element is a sun gear, and the third rotation element is a planet carrier.

20. The power transmitting apparatus of claim 19, wherein the first clutch is disposed between the sun gear and the first input shaft, and the second clutch is disposed between the sun gear and the second input shaft.

21. The power transmitting apparatus of claim 2, wherein the at second input gear assembly fixedly disposed on the second input shaft includes a first input gear operated at a second forward speed or a reverse speed, and a second input gear operated at a fourth forward speed or a sixth forward speed, wherein the first and second input gears are disposed in a first sequence from a front side to a rear side of the second input shaft, wherein the first input gear assembly fixedly disposed on the first input shaft includes a third input gear operated at a seventh forward speed, a fourth input gear operated at a first forward speed, a fifth input gear operated at a fifth forward speed, and a sixth input gear operated at a third forward speed, wherein the third, fourth, fifth, and sixth input gears are disposed in a second sequence from a front side to a rear side of the first input shaft.

22. The power transmitting apparatus of claim 21, wherein the speed output device comprises:

a first speed output unit including a first output shaft disposed in parallel with the first and second input shafts, and first and second synchronizing modules disposed on the first output shaft, the first speed output unit selectively connecting four speed gears to the first output shaft by selective operation of the first and second synchronizing modules and outputting the torque as four speeds;

a second speed output unit including a second output shaft disposed in parallel with the first and second input shafts, and third and fourth synchronizing modules disposed on the second output shaft, the second speed output unit selectively connecting another four speed gears to the second output shaft by selective operation of the third and fourth synchronizing modules and outputting the torque as another four speeds; and a reverse speed output unit including a reverse speed shaft and an idle gear disposed on the reverse speed shaft and engaged with any one input gear among the input gears on the second input shaft and any one speed gear among speed gears on the second output shaft.

23. The power transmitting apparatus of claim 22, wherein the first synchronizing module selectively connects a second speed gear engaged with the first input gear or a sixth speed gear engaged with the second input gear to the first output shaft.

24. The power transmitting apparatus of claim 22, wherein the second synchronizing module selectively connects a first speed gear engaged with the fourth input gear or a third speed gear engaged with the sixth input gear to the first output shaft.

25. The power transmitting apparatus of claim 22, wherein the third synchronizing module selectively connects a reverse speed gear engaged with the idle gear or a fourth speed gear engaged with the second input gear to the second output shaft.

26. The power transmitting apparatus of claim 25, wherein the idle gear is engaged with the first input gear of the second input shaft.

27. The power transmitting apparatus of claim 26, wherein the idle gear includes a large diameter gear and a small diameter gear disposed on the reverse speed shaft,
   wherein the large diameter gear is engaged with the first input gear and the small diameter gear is engaged with the reverse speed gear.

28. The power transmitting apparatus of claim 22, wherein the fourth synchronizing module selectively connects a seventh speed gear engaged with the third input gear or a fifth speed gear engaged with the fifth input gear to the second output shaft.

* * * * *